(12) United States Patent
Banerjee (10) Patent No.: US 8,520,806 B2
(45) Date of Patent: Aug. 27, 2013

(54) FORCED ANSWER COMMUNICATIONS

(75) Inventor: Debashis Banerjee, Bangalore (IN)

(73) Assignee: Novell, Inc., Provo, UT (US)

( * ) Notice: Subject to any disclaimer, the term of this patent is extended or adjusted under 35 U.S.C. 154(b) by 1241 days.

(21) Appl. No.: 12/128,751

(22) Filed: May 29, 2008

(65) Prior Publication Data

US 2009/0296901 A1 Dec. 3, 2009

(51) Int. Cl.
*H04M 11/04* (2006.01)

(52) U.S. Cl.
USPC .............................................. 379/46; 379/48

(58) Field of Classification Search
USPC ...................... 379/46, 37, 38, 203.01, 352, 48
See application file for complete search history.

(56) References Cited

U.S. PATENT DOCUMENTS

| | | | |
|---|---|---|---|
| 5,305,370 A | 4/1994 | Kearns et al. | |
| 6,295,346 B1 * | 9/2001 | Markowitz et al. | ...... 379/127.01 |
| 6,567,502 B2 | 5/2003 | Zellner et al. | |
| 6,728,339 B2 | 4/2004 | Kucmerowski et al. | |
| 6,968,044 B2 * | 11/2005 | Beason et al. | ................ 379/45 |
| 7,164,921 B2 | 1/2007 | Owens et al. | |
| 2004/0086092 A1 * | 5/2004 | Fehr | ............................... 379/37 |
| 2008/0212746 A1 * | 9/2008 | Gupta et al. | .................... 379/38 |

* cited by examiner

*Primary Examiner* — Alexander Jamal
(74) *Attorney, Agent, or Firm* — Schwegman, Lundberg & Woessner, P.A.

(57) ABSTRACT

Apparatus, systems, and methods may operate to implement forced answer communications by receiving a request to permit emergency activation of a first telephone in response to a call placed by a second telephone having a defined telephone number, receiving the call placed by the second telephone to the first telephone, wherein the first telephone is either on hook or turned off, and establishing a voice communication path between the first telephone and the second telephone. The path may be established by either sending an off hook command to the first telephone if the first telephone is turned on and on hook, or sending a combination of turn on and off hook commands to the telephone if the first telephone is turned off. Additional apparatus, systems, and methods are disclosed.

25 Claims, 4 Drawing Sheets

FORCED ANSWER COMMUNICATIONS

BACKGROUND

In some situations, including emergencies, an incapacitated telephone user may be unable to reach the phone to make or take a call. The state of affairs may be even more complicated when a cellular telephone is used, since the phone does not operate to receive calls if it is turned off. Given these circumstances, incapacitated users may be unable to communicate with others to receive help when assistance is most needed.

SUMMARY

In various embodiments, apparatus, systems, and methods that support forced answer communications are provided. For example, in some embodiments, such communication is enabled by receiving a request to permit emergency activation of a first telephone in response to a call placed by a second telephone having a defined telephone number. Most embodiments include receiving the call placed by the second telephone to the first telephone, wherein the first telephone is either on hook or turned off. Thereafter, many embodiments include establishing a voice communication path between the first telephone and the second telephone by either sending an off hook command to the first telephone if the first telephone is turned on and on hook, or sending a combination of turn on and off hook commands to the first telephone if the first telephone is turned off. Additional embodiments are described, and along with the foregoing example, will be set forth in detail below.

DETAILED DESCRIPTION

Some of the challenges described above may be addressed by permitting a calling party to force establishing a voice path connection to a landline or a cell phone under a variety of circumstances, so that emergency communications, for example, can be initiated by the calling party. The calling party may also be permitted to force called phones that are turned off (e.g., a cell phone) to switch on, so that the forced connection can be established even when the called phone is not operational.

When forced answer communications are established, a calling party can listen to the environment surrounding the called phone, which may be useful when the called party is nearby, but incapable of answering their phone. Then the voice of the called party can be heard by the calling party, and a conversation can be held between the parties, even if the called party is incapacitated and unable to physically reach the phone to answer it. Phones coupled to trunk lines, such as trunks in ISDN (Integrated Services Digital Network) networks, may also be amenable to this mechanism of forced answer communications in some embodiments.

In some embodiments, an emergency tone may be transmitted to and presented by the called phone to alert those in the vicinity that forced answer communications have been initiated.

As used herein, a telephone is "off hook" when it is operational (e.g., it is turned on and capable of receiving calls), and in a state that permits a voice path to be established between the telephone and another communications device.

A telephone is "on hook" when it is operational, but not in a state that permits a voice communication path to be established between the phone and another communications device.

In some embodiments, a mechanism to manage forced answer communications can be implemented as follows. First, a subscriber that would like to be contacted using forced answer communications (e.g., an elderly person that anticipates an incapacitating emergency) can register with their telephone service provider, whether for landline or cellular communications, to implement a "remote emergency off hook" service. This subscriber can provide a list of numbers which are authorized to use this feature. In addition, the service provider may have the option of permitting certain emergency service providers or government agencies (e.g., an ambulance service, or the police, respectively) to access the feature as well.

Upon registration, the service might be stored in an end office as a feature associated with the subscriber line, perhaps provisioned in the end office switch as:
(<number>"forcedanswerfeature"<num1><num2><num3>).
Here, <number> is the number of the subscriber, "forcedanswerfeature" is the feature code, and <num1><num2> . . . <num n> are numbers of calling parties that are permitted to have forced answer communication access to the subscriber.

Service providers can publish the availability of this feature to subscribers using a set of star codes to activate/deactivate the feature. In some embodiments, the feature may be activated by any subscriber that desires to permit emergency access to their phone using forced answer communications by dialing:
*<forcedanswerenablecode>#<accessnumber>.
Here, the <forcedanswerenablecode> may be a predefined code such as <99> to initiate service activation at the telephone number specified by <accessnumber>. In some embodiments, no <accessnumber> is needed, since the telephone used to initiate the service is presumed to be the same phone that can be forced to answer in an emergency.

A similar sequence of codes and an optional number, such as *<forcedanswerdisablecode>#<accessnumber> (e.g., using a predefined code of <11> in a code entry sequence of *11#), can be used to deactivate the feature. In some embodiments, the feature is activated upon registration with the service provider, and remains activated until explicitly deactivated by the registering subscriber.

Assuming that the forced answer communication feature is activated, and a call arrives from one of the numbers authorized to access the subscriber's phone using forced answer communications access, an emergency tone that indicates the subscriber's phone has been accessed in this manner can be played by the subscriber's phone. The tone indicates to nearby parties that forced answer communications are being established.

In this situation, a telephone system switch along the call path (e.g., an end office switch) can send an off hook pulse to the subscriber's phone, whether it is a landline or cell phone.

If the subscriber's phone is a cell phone, and it is turned on, then this same procedure can be used.

If the subscriber's phone is a cell phone that is turned off when the emergency access call comes through the switch, the switch can operate to send out a command to switch on the cell phone prior to sending the emergency tone and/or off hook pulse. For example, the cell phone may be fitted with a transceiver that is always on, and that transmits the location coordinates of the phone. The transceiver, upon receiving the command to switch on the phone may then operate to enable power to the rest of the phone, placing it in a fully operational state, so that it can respond to a subsequent off hook pulse command.

The forced answer communications feature may also be provisioned for telephones coupled to a trunk. In this way, authorized calling parties can access a subscriber associated with a specific line/extension linked to the trunk. For example, if the feature is enabled, the end office switch might be provisioned as:

(<trunk>"forcedanswerfeature"<num1><num2><num3>).

Here, the <trunk> may specify an ISDN trunk and the subscriber's extension, "forcedanswerfeature" is the feature code, and <num1><num2> . . . <num n> are numbers of calling parties that are permitted to have emergency access to the subscriber's extension on the trunk.

Embodiments of the invention can be implemented in a variety of architectural platforms, operating and server systems, devices, systems, and applications. Any particular architectural layout or implementation presented herein is thus provided for purposes of illustration and comprehension only, and is not intended to limit the various embodiments.

Figure 1:
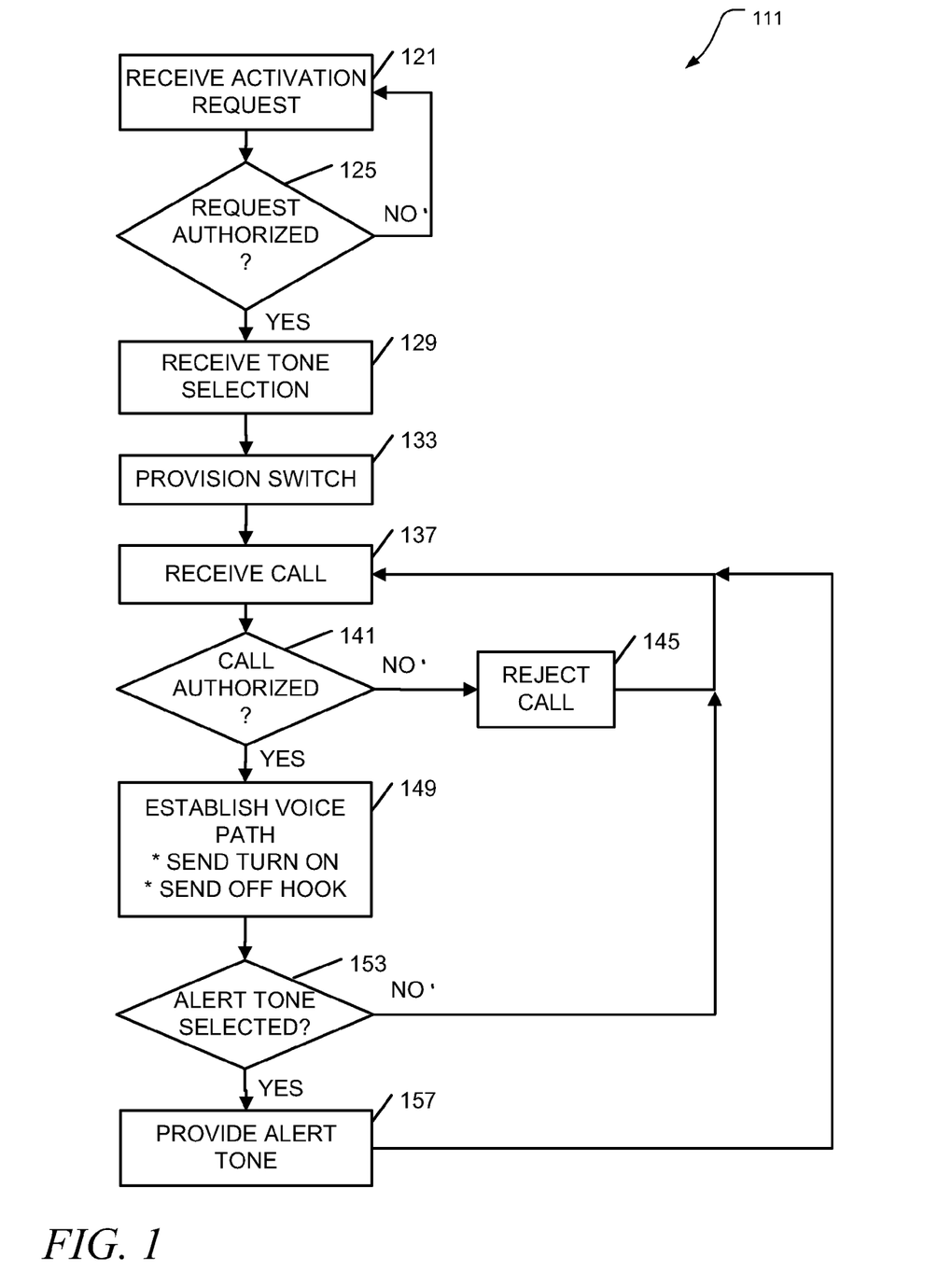
FIG. 1 is a flow diagram illustrating forced answer communication methods according to various embodiments of the invention.

FIG. 1 is a flow diagram illustrating forced answer communication methods 111 according to various embodiments of the invention. The methods 111 are implemented in a machine-accessible and readable medium. The forced answer communication methods 111 are operational over processes within and among networks. The networks may be wired, wireless, or a combination of wired and wireless. The methods 111 may be implemented as instructions, which when accessed by a machine, perform the processing depicted in FIG. 1. Given this context, forced answer communication is now discussed with reference to FIG. 1.

In some embodiments, the method 111 may begin at block 121 with receiving a request to permit emergency activation of a first telephone (e.g., a subscriber that wants to register for and/or activate the forced answer communications feature). As described previously, remote off hook emergency answer service is intended to occur in response to a call placed by a second telephone (e.g., the calling party) having a defined telephone number, such as a number authorized by the subscriber requesting implementation of the service.

In some embodiments, the method 111 may continue on to block 125 with determining whether the request has been made by the telephone associated with the subscriber's telephone number. In some embodiments, the request is not accepted if the request is not initiated by the telephone that is not the object of the forced answer communications (e.g., the first telephone). That is, in some cases, only the telephone associated with the subscriber's phone number may be used to make the request. If the telephone used to make the request is not the same as the subscriber's telephone, the request may be denied, and the method 111 may return to block 121.

In some embodiments, the method 111 may continue on to block 129 with receiving an emergency tone selection. For example, the subscriber may determine at the time of making a request to enable forced answer communications, or at the time of activating the service, that an emergency tone will, or will not be sent to the subscriber's phone in conjunction with using the feature. In a crowded or public emergency situation, for example, the subscriber may decide that transmitting the tone is useful. On the other hand, in the case of a robbery, for example, use of the tone may be counterproductive.

The method 111 may go on to block 133 with provisioning the forced answer communications service in a switch as a feature associated with the first telephone in response to the request. For example, an end office switch, or a mobile switching center (MSC) may operate to store an entry in the service database for services to be provided to the first telephone, including the forced answer communications service.

If the subscriber's telephone is coupled to a trunk, the activity at block 133 may include provisioning the emergency activation in the switch as a feature associated with a trunk, wherein the first telephone is an extension coupled to the trunk. In this case, the extension may be viewed as a logical entity that connects with an ISDN network. A private branch exchange (PBX) may terminate the ISDN trunk to provide a connection to the end office switch that transmits off hook commands that serve to initiate forced answer communications with the extension (e.g., the first telephone).

The method 111 may go on to block 137 to include receiving the call placed by the second telephone to the first telephone. The first telephone may either be in an on hook state, or turned off.

In some embodiments, the method 111 may include, at block 141, determining whether the call coming in to the first phone has been authorized. For example, if it is determined that the call coming in to the first phone is from a third (unauthorized) telephone that is different from the second (authorized) telephone, then the method may continue on to block 145 with rejecting the call. Thus, in this case, the call is rejected if it does not originate from a second telephone that has been specifically authorized to initiate a forced answer communications call.

A number of variations may occur. For example, if it is determined that the call to be received by the first telephone is from a third (unauthorized) telephone different from the second (authorized) telephone, the call may be rejected at block 145 if the third telephone is not associated with an emergency services provider recognized by the service provider. On the other hand, the call may be accepted if the third telephone is associated with an emergency services provider, even if the number associated with the third telephone has not been explicitly authorized by the subscriber, as part of the activity in block 149.

At block 149, the method 111 may thus include establishing a voice communication path between the first telephone and the second telephone, either by sending an off hook command to the first telephone if the first telephone is turned on and on hook, or by sending a combination of turn on and off hook commands to the first telephone if the first telephone is turned off (e.g., when the subscriber's telephone is a cell phone that has been turned off). In many embodiments, a speakerphone component of the first telephone may be activated by the off hook command to establish the voice communication path.

Thus, the activity at block 149 may include sending the turn on command to the first telephone when the first telephone comprises a cellular telephone. In some embodiments, the activity at block 149 may include sending the turn on command to the first telephone to initiate application of operational power to a cellular telephone radio receiver in the first telephone. The cellular telephone radio receiver is separate from the low-power transceiver described previously. That is, the cellular telephone radio receiver is turned off when the cell phone is turned off, and when turned on by the low-power radio receiver/transceiver, is then used to enable voice communications with a cellular radio base station.

The low-powered receiver or transceiver that is used in the first telephone may be similar to or identical to the receiver used in the detection system described in U.S. Pat. No. 7,164,921, incorporated herein by reference in its entirety. Alternatively, a pager or other micro-powered receiver may be present in the first phone. In some embodiments, the low-power receiver/transceiver is always on for the subscriber's telephone. In others, the low-power receiver/transceiver may go into a sleep mode, waking up every 5, 10, or 15 seconds to determine if a turn on command is being sent. If not, then the low-power receiver/transceiver can return to a sleep mode. If so, then power can be applied to the rest of the subscriber's telephone, including the cellular telephone radio receiver, so that the phone can be used to receive a ring tone or an off hook command. The off hook command can be sent to the first telephone to activate a speaker when the first telephone comprises a speakerphone, whether cellular or otherwise.

The method 111 may go on to block 153 to determine, based on the activity of block 129, whether an audible emergency tone should be provided in conjunction with using the forced answer communication service. Thus, the method 111 may continue on to block 157 with selectively providing an audible emergency feature activated tone to the first telephone after the voice communication path is established based on the selection made at block 129.

In some embodiments, there is no choice about providing the audible emergency feature activated tone. That is, the activity at block 157 may include providing a mandatory audible emergency feature activated tone to the first telephone after the voice communication path is established. A determination as to whether the audible emergency feature activated tone should be transmitted to the subscriber may also be made by the service provider in some embodiments, either at the time of subscriber registration, or subsequently. The tone may be a unique tone transmitted via the speaker of the subscriber telephone, or perhaps using the ringer of the subscriber telephone. In any case, transmitting the tone to the subscriber's telephone (e.g., the first telephone) may address privacy concerns held by the subscriber. Other embodiments may be realized.

Figure 2:
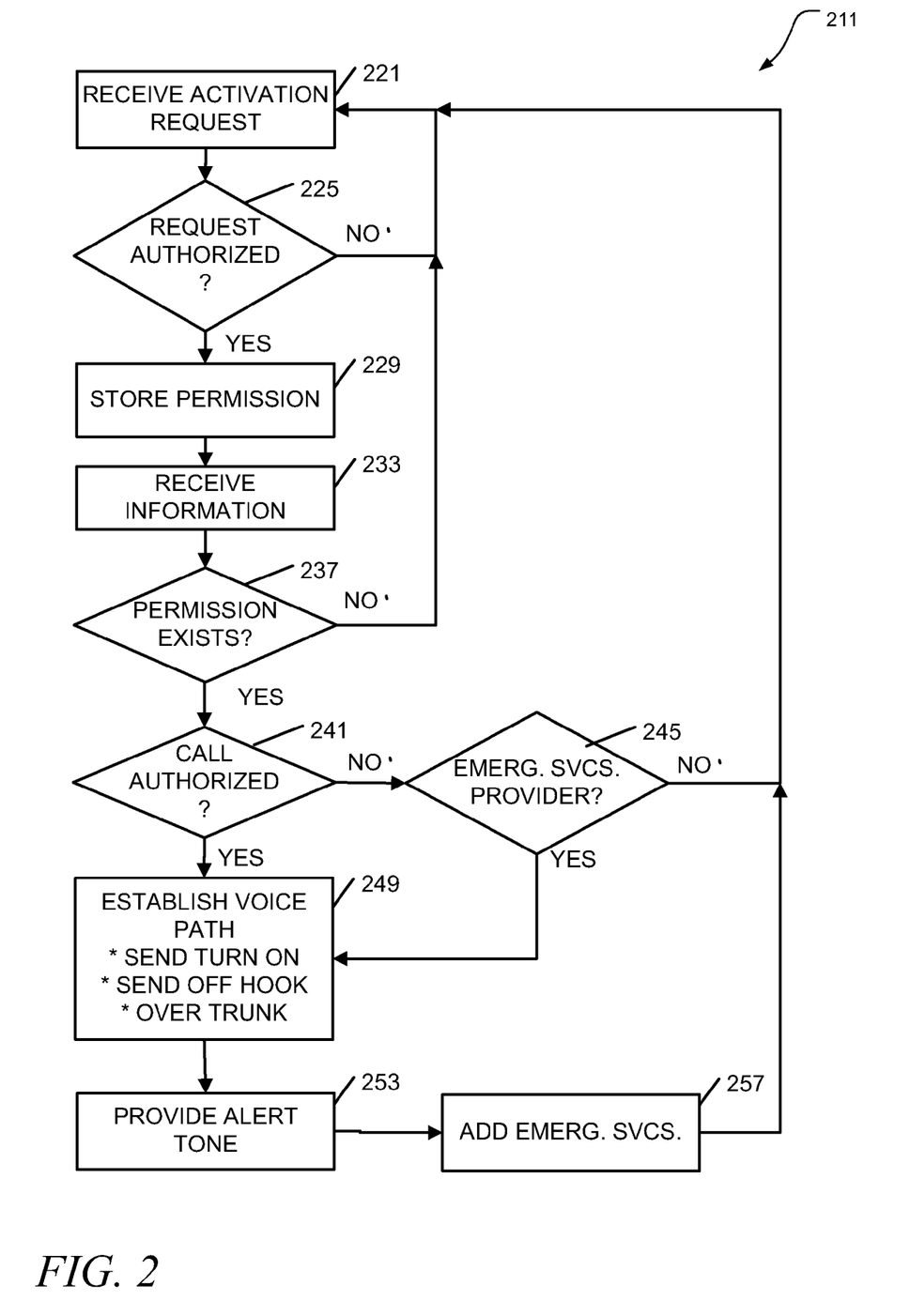
FIG. 2 is another flow diagram illustrating forced answer communication methods according to various embodiments of the invention.

For example, FIG. 2 is another flow diagram illustrating forced answer communication methods 211 according to various embodiments of the invention. In this case, forced answer communication is described with additional emphasis on telephone switch operations. The methods 211 are implemented in a machine-accessible and readable medium. The forced answer communication methods 211 are operational over processes within and among networks. The networks may be wired, wireless, or a combination of wired and wireless. The methods 211 may be implemented as instructions, which when accessed by a machine, perform the processing depicted in FIG. 2.

To implement forced answer communications, a method 211 may begin at block 221 with receiving a request to permit emergency activation of a first telephone by a second telephone, as described previously. In some embodiments, the method 211 may include, at block 225, refusing to store the permission in the database if the request providing the permission is not initiated by the first telephone. Thus, in selected embodiments, the activation request is not effective if the request for a selected telephone is not also made by that same telephone.

The method 211 may continue on to block 229 with storing the emergency contact service permission, perhaps in a home location register (HLR) associated with the first telephone, such as when the first telephone comprises a cellular telephone.

The method 211 may continue on to block 233 with receiving information associated with a call placed by a second telephone to the first telephone, wherein the first telephone is either on hook or turned off. The method 211 may then continue on to block 237 with verifying existence of the permission in a database associated with emergency activation of the first telephone, perhaps in response to a call placed from the second telephone having a defined telephone number. If the permission does not exist, then the method 211 may continue on to block 221.

If the permission is found to exist at block 237, the method 211 may continue on to block with 241 to include determining whether the incoming forced answer communications call is authorized. If it is determined that the incoming call is not authorized (e.g., the call does not come from an authorized second telephone), then the method 211 may continue on to block 245 with determining that the second telephone number is identified with an emergency service provider, and then on to block 249 with establishing the voice communication path as an exception to determining that the second telephone is not identified by the defined telephone number. In this way, an emergency service provider can be allowed to unilaterally establish forced answer communications even when no explicit permission has been given by the subscriber.

If the incoming forced answer communications call is determined to originate from an authorized source, then the method 211 may go on to block 249 from block 241 with establishing a voice communication path between the first telephone and the second telephone. In some embodiments, this occurs only when the second telephone is identified by the defined telephone number as part of the information received at block 233. The voice communication path is established by either sending an off hook command to the first telephone if the first telephone is turned on and on hook, or sending a combination of turn on and off hook commands to the first telephone if the first telephone is turned off. The activity at block 249 may include establishing the voice communication path over a trunk to the second telephone, with the first telephone comprising an extension coupled to the trunk.

After the voice communication path is established, the method 211 may go on to block 253 to include providing an audible emergency feature activated tone to the first telephone. Assertion of the tone may be mandatory, or otherwise, as described previously.

In some embodiments, emergency services may be added at block 257. Thus, the method 211 may include receiving a request for emergency services, transmitting the second number to an emergency service provider, and establishing the voice communication path between the emergency services provider and the second telephone. In other words, an explicit request to add an emergency service provider to the communication path might be invoked by either the first telephone or the second telephone, perhaps using a coded request or series of tones. The result might be establishing the voice communications path between the emergency services provider (e.g., a doctor) and the first and second telephones.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Many other embodiments may be realized.

Figure 3:
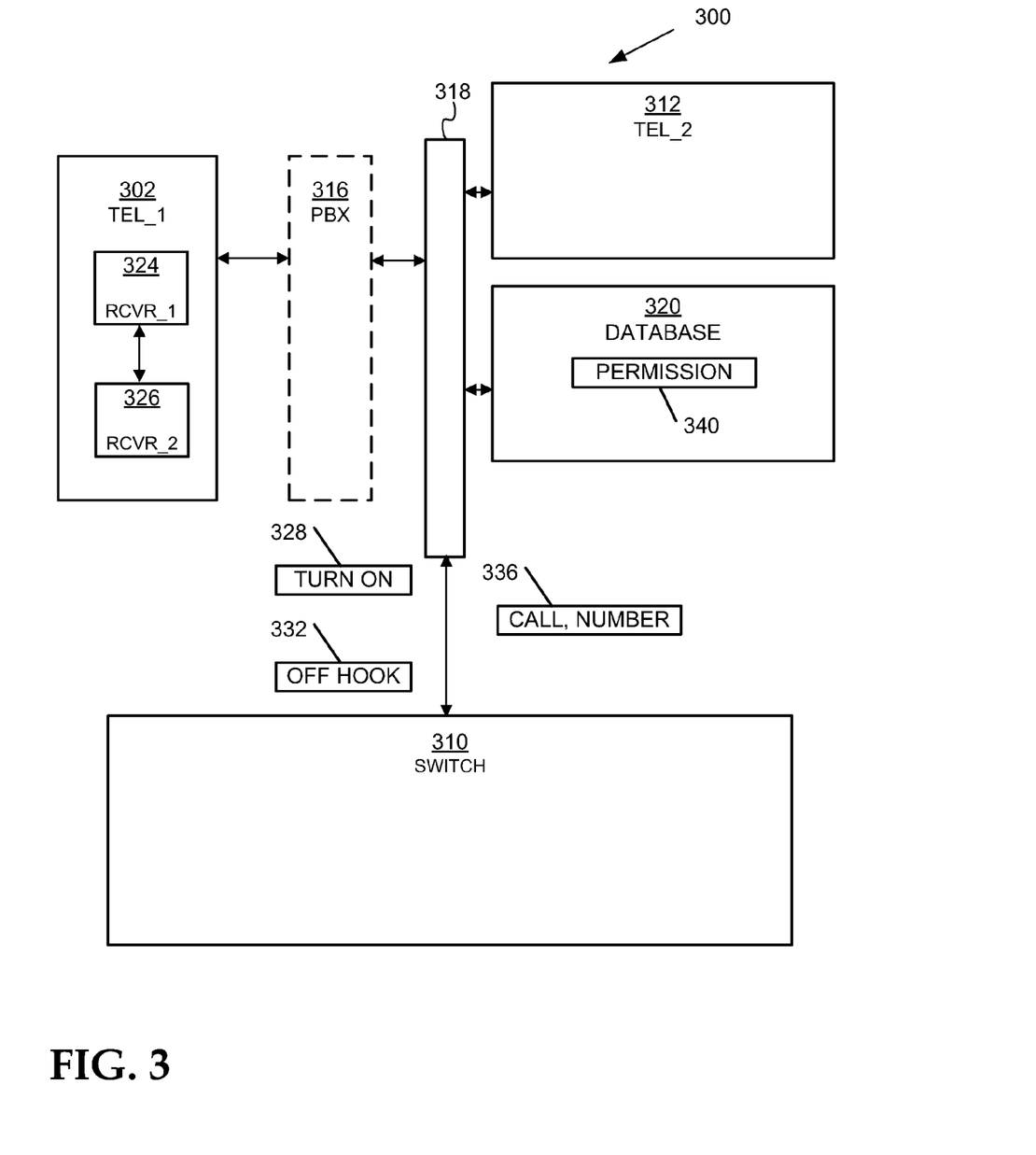
FIG. 3 is a block diagram of a forced answer communications apparatus according to various embodiments of the invention.

For example, FIG. 3 is a block diagram of a forced answer communications apparatus 300 according to various embodiments of the invention. Here it can be seen that an apparatus 300 used to implement forced answer communications may comprise a database 320 to store permission 340 associated with emergency activation of a first telephone 302 in response to a call 336 placed from a second telephone 312 having a defined telephone number NUMBER.

The apparatus 300 may further comprise a telephone switch 310 to establish a voice communication path 318 between the first telephone 302 and the second telephone 312 when the second telephone 312 is identified by the defined telephone number NUMBER as part of the call 336. As described previously, the path 318 is established by either sending an off hook command 332 to the first telephone 302 if the first telephone 302 is turned on and on hook, or sending a combination of a turn on command 328 and an off hook command 332 to the first telephone 302 if the first telephone 302 is turned off. The database 320 may be included in the switch 310, or located remotely, such as when the telephone switch 310 is coupled to the database 320 using a public switched telephone network (included in the path 318). In some embodiments, the apparatus 300 comprises a PBX 316 to couple to the first telephone 302.

The forced answer communications apparatus 300 may be implemented in a machine-accessible and readable medium and is operational over one or more networks (e.g., comprising path 318). The networks may be wired, wireless, or a combination of wired and wireless. The forced answer communications apparatus 300 implements, among other things, the processing associated with the forced answer communication methods 111 and 211 of FIGS. 1 and 2, respectively. Modules may comprise hardware, software, and firmware, or any combination of these. Additional embodiments may be realized.

Figure 4:
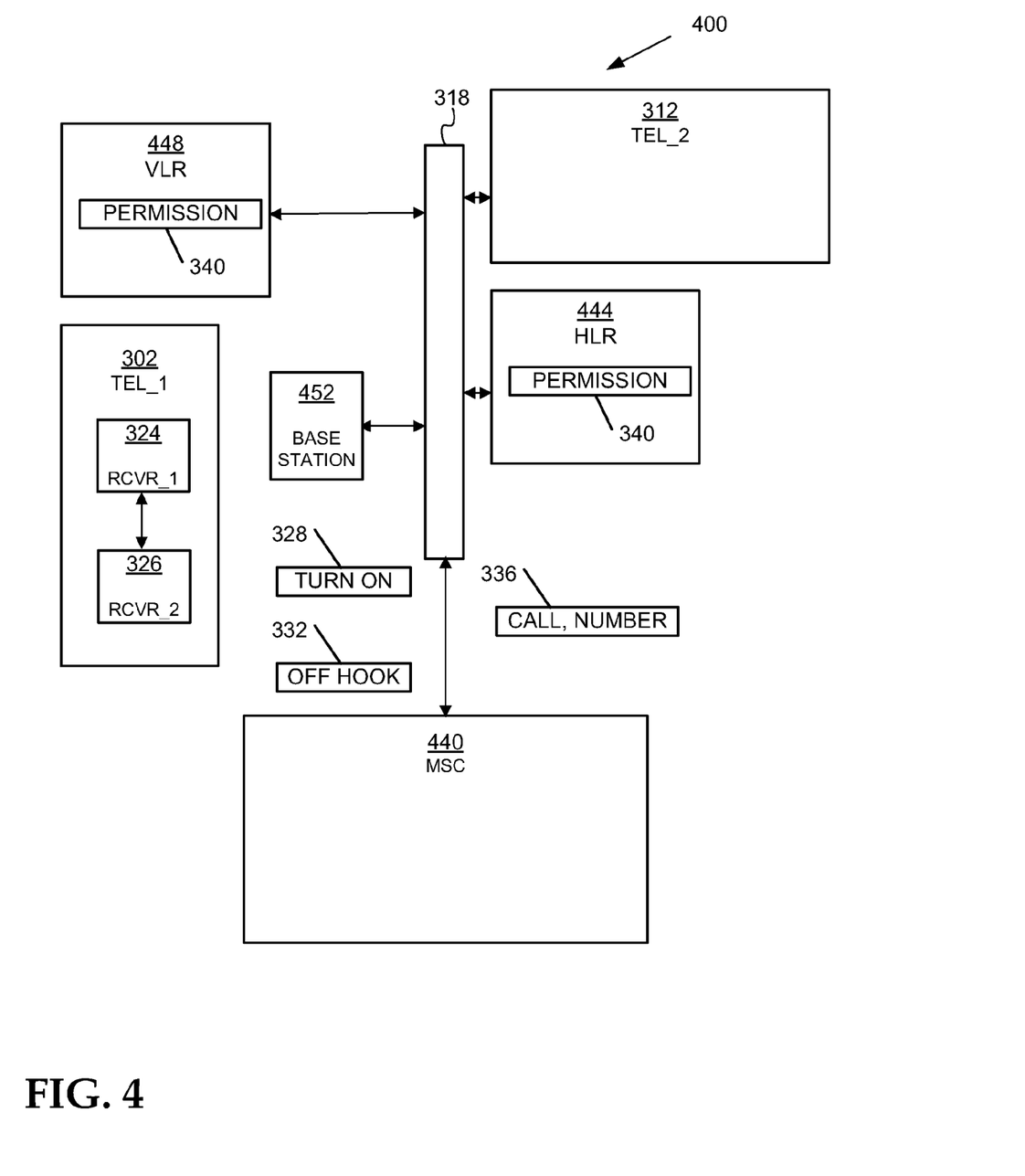
FIG. 4 is a block diagram of a forced answer communications system according to various embodiments of the invention.

For example, FIG. 4 is a block diagram of a forced answer communications system 400 according to various embodiments of the invention. The forced answer communications system 400 may be implemented in a machine-accessible and readable medium and is operational over one or more networks (e.g., comprising path 318). The networks may be wired, wireless, or a combination of wired and wireless. The forced answer communications system 400 may include multiple instances of the apparatus 300, and implements, among other things, the processing associated with the forced answer communication methods 111 and 211 of FIGS. 1 and 2, respectively.

Turning now to FIG. 4, it can be seen that a forced answer communications system 400 comprises a home location register (HLR) 444 including a database to store permission 340 associated with emergency activation of a first telephone 302 in response to a call 336 placed from a second telephone 312 having a defined telephone number NUMBER. The system 400 further comprises an MSC 440 to establish a voice communication path 318 between the first telephone 302 and the second telephone 312 when the second telephone 312 is identified by the defined telephone number NUMBER as part of the call 336, by either sending an off hook command 332 to the first telephone 302 if the first telephone 302 is turned on and on hook, or sending a combination of a turn on command 328 and an off hook command 332 to the first telephone 302 if the first telephone 302 is turned off.

In some embodiments, the system 400 comprises a visitor location register (VLR) to receive the permission 340 if the first telephone 302 comprises a roaming cellular telephone.

The system 400 may also comprise a base station 452 to initiate application of operational power to a radio receiver 324 in the first telephone 302 responsive to the turn on command 328. As described previously, a low power receiver 326 may be left in an "always-on" condition, so that when the turn on command 328 is received, power can be applied to the main cellular telephone receiver 324, as well as to the rest of the telephone 302, so that it is fully operational, and ready to receive off hook commands 332. The receivers 324, 326 may optionally be included in one or more transceivers in some embodiments.

Implementing the apparatus, systems, and methods described herein may thus provide the ability to implement forced answer communications under a variety of circumstances, including when the called party makes use of a landline telephone, an extension of a trunk, or a cellular telephone—even if the cellular telephone is switched off. In addition, the use of forced answer communications can be selectively announced using an emergency tone transmitted to the called party, and the service can be provisioned by the subscriber for a specified set of personal numbers and/or emergency numbers. Increased safety and security for subscribers that implement the service may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
  a database to store permission associated with emergency activation of a first telephone in response to a call placed from a second telephone having a defined telephone number; and
  a telephone switch to establish a voice communication path between the first telephone and the second telephone when the second telephone is identified by the defined telephone number as part of the call and to determine whether the first telephone is turned off and on hook or whether the first telephone is turned on and on hook, wherein the telephone switch is to send an off hook command to the first telephone when the telephone switch determines the first telephone is turned on and on hook, and a combination of turn on and off hook commands to the first telephone when the telephone switch determines the first telephone is turned off, the turn on command configured to force the first telephone that is turned off to turn on.

2. The apparatus of claim 1, comprising:
a private branch exchange to couple to the first telephone.

3. The apparatus of claim 1, wherein the telephone switch is coupled to the database using a public switched telephone network.

4. A system, comprising:
a home location register including a database to store permission associated with emergency activation of a first telephone in response to a call placed from a second telephone having a defined telephone number; and
a mobile switching center to establish a voice communication path between the first telephone and the second telephone when the second telephone is identified by the defined telephone number as part of the call and to determine whether the first telephone is turned off and on hook or whether the first telephone is turned on and on hook, wherein the telephone switch is to send an off hook command to the first telephone when the telephone switch determines the first telephone is turned on and on hook, and a combination of turn on and off hook commands to the first telephone when the telephone switch determines the first telephone is turned off, the turn on command configured to force the first telephone that is turned off to turn on.

5. The system of claim 4, comprising:
a visitor location register to receive the permission if the first telephone comprises a roaming cellular telephone.

6. The system of claim 4, comprising:
a base station to initiate application of operational power to a radio receiver in the first telephone responsive to the turn on command.

7. A method, comprising:
receiving a request to permit emergency activation of a first telephone in response to a call placed by a second telephone having a defined telephone number;
receiving the call placed by the second telephone to the first telephone;
establishing, by a telephone switch, a voice communication path between the first telephone and the second telephone;
determining, by the telephone switch, whether the first telephone is turned off and on hook or whether the first telephone is turned on and on hook:
sending an off hook command to the first telephone when the telephone switch determines the first telephone is turned on and on hook; and
sending a combination of turn on and off hook commands to the first telephone when the telephone switch determines the first telephone is turned off, the turn on command configured to force the first telephone that is turned off to turn on.

8. The method of claim 7, comprising:
providing a mandatory audible emergency feature activated tone to the first telephone after the voice communication path is established.

9. The method of claim 7, comprising:
receiving an emergency tone selection; and
selectively providing an audible emergency feature activated tone to the first telephone after the voice communication path is established based on the selection.

10. The method of claim 7, comprising:
provisioning the emergency activation in a switch as a feature associated with the first telephone in response to the request.

11. The method of claim 7, comprising:
provisioning the emergency activation in a switch as a feature associated with a trunk, wherein the first telephone is an extension coupled to the trunk.

12. The method of claim 7, wherein
the first telephone comprises a cellular telephone.

13. The method of claim 7, wherein the sending the turn on command to the first telephone comprises:
initiating application of operational power to a radio receiver in the first telephone using a low power receiver in the first telephone.

14. The method of claim 7, comprising:
sending the off hook command to the first telephone to activate a speaker when the first telephone comprises a non-cellular speakerphone.

15. The method of claim 7, comprising:
receiving the call from a third telephone different from the second telephone; and
rejecting the call.

16. The method of claim 7, comprising:
receiving the call from a third telephone different from the second telephone;
accepting the call if the third telephone is associated with an emergency services provider; and
rejecting the call if the third telephone is not associated with an emergency services provider.

17. The method of claim 7, wherein the request is not accepted if the request is not initiated by the first telephone.

18. A method, comprising:
receiving information associated with a call placed by a second telephone to a first telephone;
verifying existence of permission in a database associated with emergency activation of the first telephone in response to a call placed from the second telephone having a defined telephone number;
establishing, by a telephone switch, a voice communication path between the first telephone and the second telephone when the second telephone is identified by the defined telephone number as part of the information;
determining, by the telephone switch, whether the first telephone is turned off and on hook or whether the first telephone is turned on and on hook;
sending an off hook command to the first telephone when the telephone switch determines the first telephone is turned on and on hook; and
sending a combination of turn on and off hook commands to the first telephone when the telephone switch determines the first telephone is turned off, the turn on command configured to force the first telephone that is turned off to turn on.

19. The method of claim 18, comprising:
storing the permission in a home location register associated with the first telephone.

20. The method of claim 18, comprising:
establishing the voice communication path over a trunk to the second telephone as an extension coupled to the trunk.

21. The method of claim 18, comprising:
establishing the voice communication path when the second telephone is not identified by the defined telephone number, based on determining that the second telephone is identified with an emergency service provider.

22. The method of claim 18, comprising:
receiving a request for emergency services;
transmitting the second number to an emergency service provider; and establishing the voice communication path between the emergency services provider and the second telephone.

23. The method of claim 18, comprising:

providing a mandatory audible emergency feature activated tone to the first telephone after the voice communication path is established.

24. The method of claim 18, comprising:

refusing to store the permission in the database if a request providing the permission is not initiated by the first telephone.

25. The apparatus of claim 1, wherein the off hook command is configured to:

force the first telephone that is turned on to switch from an on-hook state to an off-hook state, the first telephone incapable of establishing the voice communication path when in the on-hook state and capable of establishing the voice communication path when in the off-hook state.

\* \* \* \* \*